(12) United States Patent
Peng et al.

(10) Patent No.: US 7,884,561 B2
(45) Date of Patent: Feb. 8, 2011

(54) METHOD AND APPARATUS FOR SPEED CONTROL SELECTION IN ELECTRONICALLY COMMUTATED MOTOR

(75) Inventors: Aiqian Peng, Zhongshan (CN); Maosen Zeng, Zhongshan (CN); Wenwei Huang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 584 days.

(21) Appl. No.: 11/623,787

(22) Filed: Jan. 17, 2007

(65) Prior Publication Data

US 2007/0247094 A1    Oct. 25, 2007

(30) Foreign Application Priority Data

Apr. 22, 2006    (CN)    .................. 2006 1 0035194

(51) Int. Cl.
*H02P 6/06* (2006.01)
(52) U.S. Cl. ............. 318/268; 318/400.06; 318/400.12
(58) Field of Classification Search ................. 318/268, 318/400.01, 400.03, 400.06, 400.12, 479, 318/504, 700; 388/803–806, 809–815
See application file for complete search history.

(56) References Cited

U.S. PATENT DOCUMENTS

| | | | | |
|---|---|---|---|---|
| 3,739,158 A | * | 6/1973 | Woodward | 318/571 |
| 4,123,692 A | * | 10/1978 | Gilmore et al. | 363/41 |
| 4,245,298 A | * | 1/1981 | Slater | 700/69 |
| 4,387,421 A | * | 6/1983 | Zach et al. | 700/28 |
| 4,459,525 A | * | 7/1984 | Hasegawa | 318/561 |
| 4,680,513 A | * | 7/1987 | Kennedy | 318/285 |
| 5,041,825 A | * | 8/1991 | Hart et al. | 340/3.4 |
| 5,189,349 A | * | 2/1993 | Haga | 318/400.07 |
| 5,473,229 A | * | 12/1995 | Archer et al. | 318/400.18 |
| 5,878,189 A | * | 3/1999 | Lankin et al. | 388/801 |
| 6,239,567 B1 | * | 5/2001 | Sunaga et al. | 318/432 |
| 6,369,536 B2 | * | 4/2002 | Beifus et al. | 318/400.12 |
| 6,670,783 B2 | * | 12/2003 | Waehner et al. | 318/696 |
| 7,190,142 B2 | * | 3/2007 | Ha | 318/599 |
| 7,619,379 B2 | * | 11/2009 | Chen et al. | 318/268 |

* cited by examiner

*Primary Examiner*—Bentsu Ro
(74) *Attorney, Agent, or Firm*—Matthias Scholl P.C.; Matthias Scholl

(57) ABSTRACT

This invention relates to a method of speed control selection for an electronically commutated motor comprising the following steps: (a) a motor controller receives an input signal T from a speed control selection circuit; (b) the motor controller retrieves a corresponding value for a motor running speed S from a comparison list correlating the input signal with the motor running speed, which list has been stored in the motor controller in advance, by searching the comparison list for the input signal T; and (c) the motor controller controlling a motor M to run at the motor running speed S, achieving the purpose of the speed selection. This method allows for from 2 to 256 speed choices with a single signal wire only. Such a circuit structure has the advantages of high integration, simple wiring, low cost, good performances, low failure rate, higher number of optional speeds, and simpler and more practical control.

18 Claims, 3 Drawing Sheets

METHOD AND APPARATUS FOR SPEED CONTROL SELECTION IN ELECTRONICALLY COMMUTATED MOTOR

CROSS-REFERENCE TO RELATED APPLICATIONS

This application claims priority to the Chinese Patent Application No. 200610035194.4 filed on Apr. 22, 2006, the contents of which are incorporated herein by reference.

BACKGROUND OF THE INVENTION

1. Field of the Invention

This invention relates to a method and circuit for speed control selection in an electronically commutated motor.

2. Description of the Prior Art

FIG. 1 shows the conventional method of speed control selection in an electronically commutated motor, i.e., the motor's running speed being controlled by a wire selection method. Each input wire connected to the motor controller can input a low voltage or high voltage signal (i.e. a digital 0 or 1 signal). Therefore when there are N wires, the maximum number of optional speeds is $2^N$.

However, this conventional method has the disadvantage: the speed selection wires are so excessive that the structure is very complex, difficult to integrate, and expensive. Accordingly, much opportunity exists for improvement in this area of technology.

SUMMARY OF THE INVENTION

The invention overcomes the above-described disadvantage. Specifically, one object of the invention is to provide a speed control selection method that only uses a single input signal wire to provide at least from 2 to 256 optional motor speeds.

To achieve this object, the presently disclosed speed control selection method for an electronically commutated motor comprises the following steps: (a) a motor controller receiving an input signal T from a speed control selection circuit; (b) said motor controller retrieving a corresponding value for a motor running speed S from a comparison list correlating said input signal with the motor running speed, which list has been stored in the motor controller in advance, by searching said comparison list for said input signal T; and (c) said motor controller controlling a motor M to run at said motor running speed S.

In certain embodiments of the invention, the motor controller controls the motor M to run at the running speed S with a closed loop control mode (i.e., utilizing feedback), allowing the running speed to fluctuate within a small range, e.g., within 1%~5% the desired value, and keeping the motor at a stable speed.

In certain embodiments of the invention, the input signal T is a voltage signal, i.e., a signal having a certain variable voltage, the voltage being variable over a certain voltage range so as to allow the motor controller to retrieve the corresponding value for the motor running speed S based on the input voltage value from the comparison list correlating the input signal with the motor running speed.

In certain embodiments of the invention, the input signal T is a pulse signal, i.e., an signal having a duty cycle, the duty cycle being variable over a certain duty cycle range so as to allow the motor controller to retrieve the corresponding value for the motor running speed S based on the duty cycle from the comparison list correlating the input signal with the motor running speed.

In certain embodiments of the invention, the input signal T is a frequency signal, i.e., a signal having a certain variable frequency, e.g., a sine wave or square wave, the frequency being variable over a certain frequency range so as to allow the motor controller to retrieve the corresponding value for the motor running speed S based on the frequency from the comparison list correlating the input signal with the motor running speed.

In other aspects of the invention, provided is a speed control selection apparatus for an electronically commutated motor comprising a motor controller having an input terminal and a speed control selection circuit having an output terminal; wherein the motor controller is electrically connected to the electronically commutated motor; the output terminal of the speed control selection circuit is (i) directly electrically connected to the input terminal of the motor controller, or (ii) connected to the input terminal of the motor controller via a photoelectric coupled circuit, the photoelectric coupled circuit isolating the motor controller from the speed control selection circuit; speed control selection circuit transmits an input signal T to the motor controller via one wire only; the motor controller carries out the following steps: (i) retrieving a corresponding value for a motor running speed S from a comparison list correlating the input signal with the motor running speed, which list has been stored in the motor controller in advance, by searching the comparison list for the input signal T; and (ii) controlling a motor M to run at the motor running speed S.

In certain embodiments of the invention, the speed control selection circuit is: a voltage generating circuit having a variable voltage output; a pulse generating circuit having a variable pulse duty cycle output; or a sine wave or square wave generating circuit with a variable frequency output.

The speed control selection circuit for an electronically commutated motor, built to function according to the above mentioned method, comprises a motor controller and a speed selection circuit. The output terminal of the motor controller is connected to the motor; the output terminal of the speed selection circuit is connected to the input terminal of the motor controller. The speed selection circuit is either connected to the motor controller directly or through a photoelectric coupled circuit, which insulates the motor controller from the circuit for speed selection.

In certain embodiments of the invention, the speed control selection circuit is either a voltage generating circuit, having a variable voltage output, a pulse generating circuit, having a variable pulse width duty cycle output, or a sine wave or square wave generating circuit, having a variable frequency output.

As a result, the speed control selection method of the invention has the following advantages compared with the existing technology: it allows a selection of from 2 to 256 different speeds with only a single input signal wire; high integration; simple wiring; a simple structure of the speed selection circuit; low cost; good performances; low failure rate; more optional speeds; and a simpler and more reasonable control system.

The speed control selection circuit of the invention has the following advantages compared with the existing technology:

a simplified circuit structure; convenient connections; low cost; more optional speeds; and an improved accuracy in speed selection.

BRIEF DESCRIPTION OF THE DRAWINGS

The preferred embodiments of the invention will hereinafter be described in more detail with reference to the accompanying drawings, in which.

DETAILED DESCRIPTION OF THE INVENTION

Figure 6:
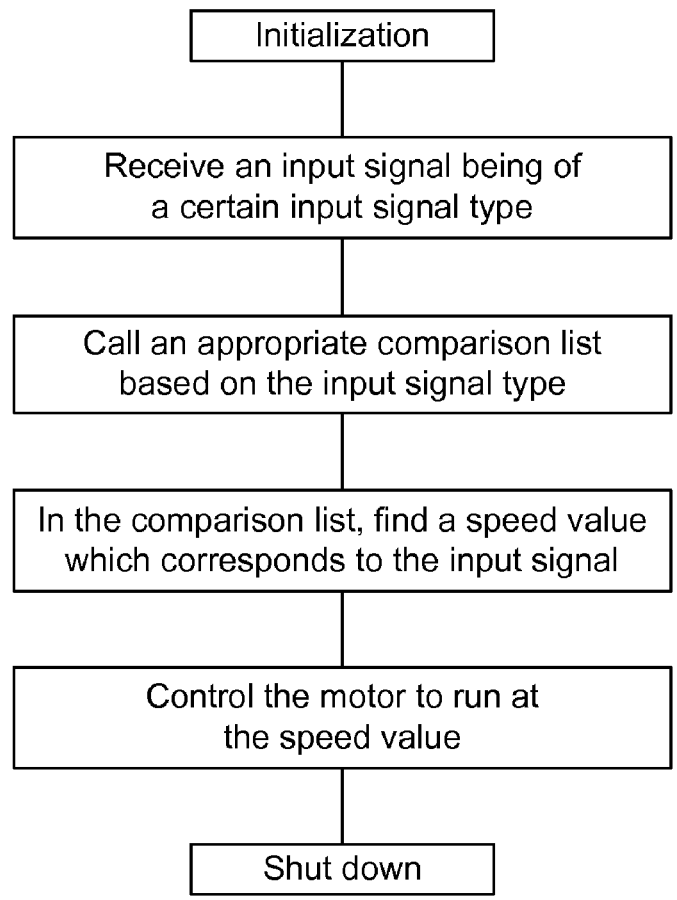
FIG. 6 is a flowchart showing speed selection steps according to an embodiment of the invention.

As shown in FIG. 6, the speed control selection method for an electronically commutated motor comprises the steps of:

(a) a motor controller receiving an input signal from a speed control selection circuit;

(b) the motor controller retrieving a value for the motor running speed S from a comparison list correlating the input signal with the motor running speed, which list has been stored in the motor controller in advance, by searching the comparison list for the input signal T; and (c) the motor controller controlling a motor M to run at the speed S.

In the above step (c), the motor controller controls the running speed of the motor via controlling the average operating voltage or the average running current of the motor.

In the above step (a), the input signal can be a voltage signal. This voltage signal is variable over a certain range, so that the motor controller can find the related motor running speed S in the above mentioned comparison list, based on the value of the input voltage. An example of a comparison list applicable to a voltage signal is shown in Table 1.

TABLE 1

| Input signal voltage T (V) | Speed S (rpm) |
|---|---|
| 10 | 300 |
| 9.5 | 400 |
| 9 | 500 |
| 8.5 | 600 |
| 8 | 700 |
| 7.5 | 800 |
| 7 | 900 |
| 6.5 | 1000 |
| 6 | 1100 |
| 5.5 | 1200 |
| 5 | 1300 |
| 4.5 | 1400 |
| 4 | 1500 |
| 3.5 | 1600 |
| 3 | 1700 |
| 2.5 | 1800 |
| 2 | 2000 |

In the above step (a), alternatively, the input signal is a pulse signal with a certain duty cycle. The duty cycle of the pulse signal, as used herein, refers to the product of the pulse duration and pulse repetition frequency of a pulse carrier, equal to the time per second that pulse power is applied, usually expressed as percentage. Duty cycle is also known as duty ratio or duty factor. The duty cycle of the pulse signal is variable over a certain range, so that the motor controller can find the related motor running speed S in the above-mentioned comparison list, based on the value of the duty cycle of the pulse signal. An example of a comparison list applicable to a pulse signal with certain duty cycle is shown in Table 2.

TABLE 2

| Pulse signal duty cycle (%) | Speed S (rpm) |
|---|---|
| 5 | 300 |
| 8 | 400 |
| 12 | 500 |
| 15 | 600 |
| 18 | 700 |
| 22 | 800 |
| 25 | 900 |
| 28 | 1000 |
| 32 | 1100 |
| 35 | 1200 |
| 38 | 1300 |
| 44 | 1400 |
| 47 | 1500 |
| 50 | 1600 |
| 52 | 1700 |
| 55 | 1800 |
| 60 | 2000 |

In the above step (a), the input signal is a frequency signal, e.g., a sine wave or square wave with a certain frequency. The frequency of this sine wave or square wave is variable over a certain range, so that the motor controller can find the related motor running speed S in the above mentioned comparison list, based on the value of the input frequency of the sine wave or square wave. An example of a comparison list applicable to a frequency signal is shown in Table 3.

TABLE 3

| Frequency (Hz) | Speed S (rpm) |
|---|---|
| 100 | 300 |
| 200 | 400 |
| 300 | 500 |
| 400 | 600 |
| 500 | 700 |
| 600 | 800 |
| 700 | 900 |
| 800 | 1000 |
| 900 | 1100 |
| 1000 | 1200 |
| 1100 | 1300 |
| 1200 | 1400 |
| 1300 | 1500 |
| 1400 | 1600 |
| 1500 | 1700 |
| 1600 | 1800 |
| 1700 | 2000 |

Although correlation tables shown above (Tables 1-3) list 17 optional speeds each, they are shown for illustrative purposes only. It is to be understood that a much greater number, for example, 50, or 100, or 150, or 256 or more, optional speeds can be transferred from a speed selection control circuit to a motor controller using one wire only. For example, to select 256 optional speeds, e.g., motor speeds from 110 rpm up to 2660 rpm evenly spaced by 10 rpm apart (110 rpm, 120 rpm, 130 rpm, . . . , 2660 rpm) using voltage signal, the voltage signal assumes 256 different values from 26.6 V down to 1.1 V evenly spaced by 0.1 V apart (26.6 V, 26.5 V, 26.4 V . . . 1.1 V). Similarly, for example, to select 256 optional speeds, e.g., from 110 up to 2660 rpm evenly spaced by 10 rpm apart (110 rpm, 120 rpm, 130 rpm, . . . , 2660 rpm) by using pulse signal having a certain duty ratio, the duty ratio assumes 256 different values from 1.1% up to 52.1% spaced evenly at 0.2% apart (1.1%, 1.3%, 1.5% . . . 52.1%). Similarly, for example, to select 256 optional speeds, e.g., from 110 rpm up to 2660 rpm evenly spaced by 10 rpm apart (110 rpm, 120 rpm, 130 rpm, . . . , 2660 rpm) using frequency signal, the frequency of the signal assumes 256 different values from 100 Hz up to 5.1 kHz spaced evenly by 20 Hz apart (100 Hz, 120 Hz, 140 Hz . . . 5100 Hz).

Figure 1:
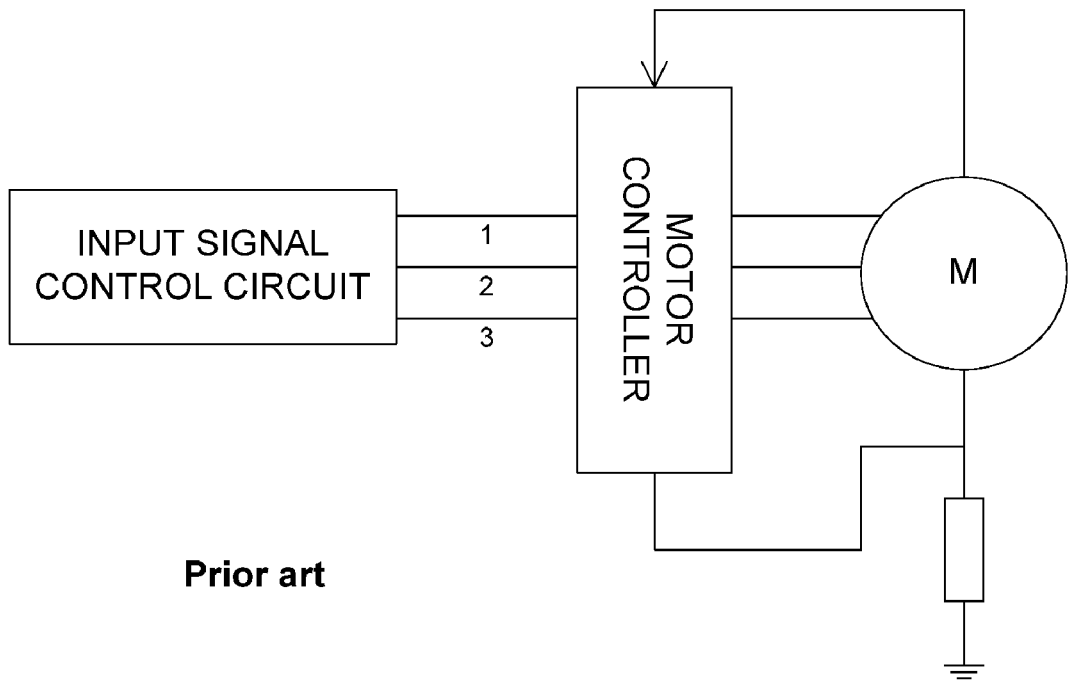
FIG. 1 is a schematic block diagram showing a traditional method for speed control selection of an electronically commutated motor (prior art)
Figure 2:
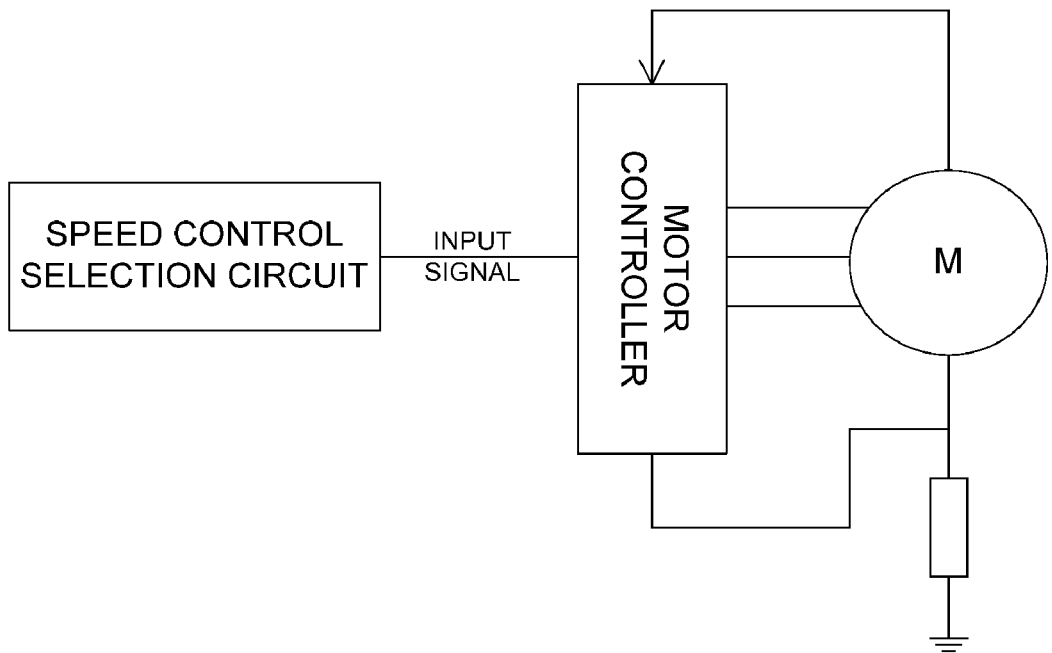
FIG. 2 is a schematic block diagram showing one embodiment of the invention.

As shown in FIG. 2, the speed control selection apparatus for an electronically commutated motor, which apparatus carries out speed control selection, comprises a motor controller and a speed control selection circuit. The output end of the motor controller is connected to the motor; the output end of the speed selection circuit is connected to the input end of the motor controller. The speed selection circuit is either connected to the motor controller directly or via a photoelectric coupled circuit, so that the motor controller is isolated from the speed selection circuit. The speed selection circuit is a voltage generating circuit having a variable voltage output (for example: a voltage regulator). Alternatively, it is a pulse generating circuit having variable pulse duty cycle output (for example: a PWM pulse width modulator). Alternatively, it is a sine wave or square wave generating circuit with a variable frequency output.

Figure 3:
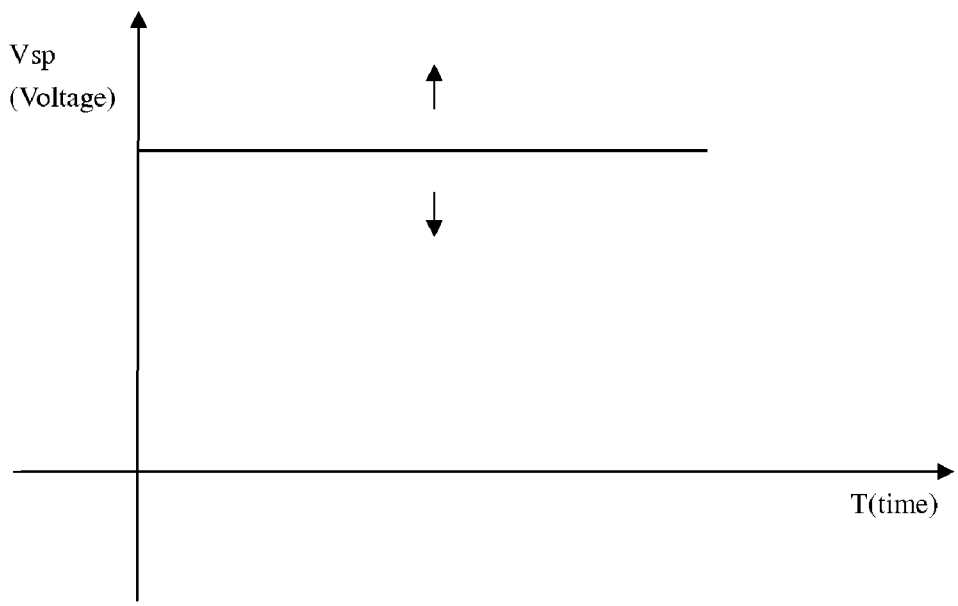
FIG. 3 illustrates voltage input signal as a function of time according to an embodiment of the invention.
Figure 4:
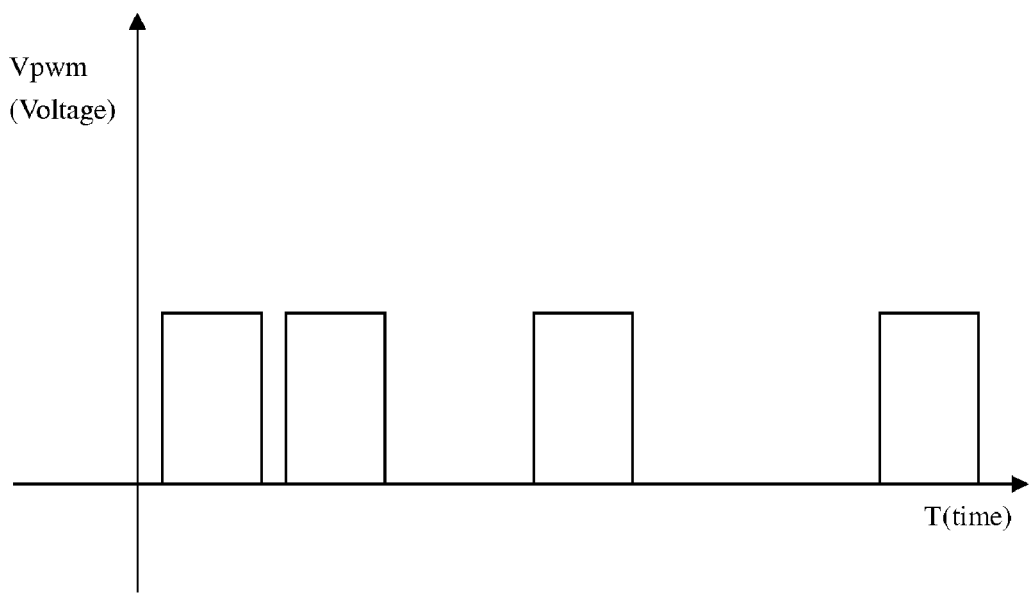
FIG. 4 illustrates pulse input signal as a function of time according to an embodiment of the invention.
Figure 5:
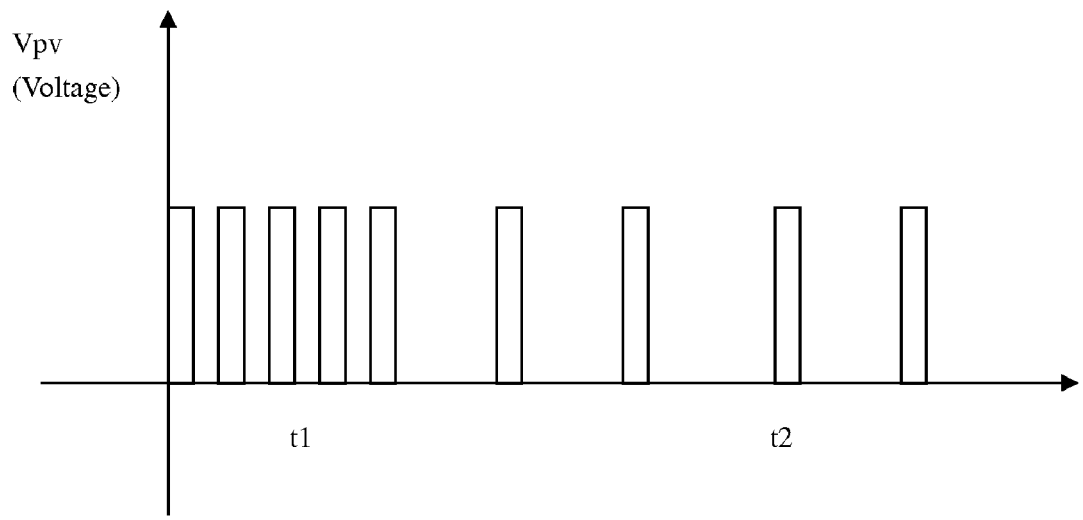
FIG. 5 illustrates frequency input signal as a function of time according to an embodiment the invention.

As shown in FIG. 3 and Table 1, if the input signal is a voltage signal, the various speeds are selected by adjusting the input voltage value. As shown in FIG. 4 and Table 2, if the input signal is a pulse signal having a certain duty cycle, the various speeds are selected by adjusting the input pulse duty cycle value. As shown in FIG. 5 and Table 3, if the input signal is a frequency signal, the various speeds are selected by adjusting the frequency value.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

What is claimed is:

1. A method of speed control selection for an electronically commutated motor, comprising the steps of:
    (a) a motor controller receiving an input signal T from a speed control selection circuit;
    (b) said motor controller retrieving a corresponding value for a motor running speed S from a comparison list correlating said input signal with the motor running speed, which list has been stored in the motor controller in advance, by searching said comparison list for said input signal T; and
    (c) said motor controller controlling a motor M to run at said motor running speed S.

2. The method of claim 1, wherein said motor controller controls the motor M to run at said running speed S with a closed loop control mode, allowing the running speed to fluctuate within a small range, and keeping the motor at a stable speed.

3. The method of claim 2, wherein said input signal T is a voltage signal, said voltage signal having a certain voltage, said voltage being variable over a certain voltage range so as to allow the motor controller to retrieve the corresponding value for said motor running speed S based on the input voltage value from the comparison list correlating the input signal with the motor running speed.

4. The method of claim 2, wherein said input signal T is a pulse signal, said pulse signal having a pulse width duty cycle, said duty cycle being variable over a certain duty cycle range so as to allow the motor controller to retrieve the corresponding value for said motor running speed S based on the duty cycle from the comparison list correlating the input signal with the motor running speed.

5. The method of claim 2, wherein said input signal T is a frequency signal, said frequency signal having a certain frequency, said frequency being variable over a certain frequency range so as to allow the motor controller to retrieve the corresponding value for said motor running speed S based on the frequency from the comparison list correlating the input signal with the motor running speed.

6. The method of claim 5, wherein said frequency signal is a sine wave or square wave.

7. The method of claim 1, wherein said input signal T is a voltage signal, said voltage signal having a certain voltage, said voltage being variable over a certain voltage range so as to allow the motor controller to retrieve the corresponding value for said motor running speed S based on the input voltage value from the comparison list correlating the input signal with the motor running speed.

8. The method of claim 1, wherein said input signal T is a pulse signal, said pulse signal having a pulse width duty cycle, said duty cycle being variable over a certain duty cycle range so as to allow the motor controller to retrieve the corresponding value for said motor running speed S based on the duty cycle from the comparison list correlating the input signal with the motor running speed.

9. The method of claim 1, wherein said input signal T is a frequency signal, said frequency signal having a certain frequency, said frequency being variable over a certain frequency range so as to allow the motor controller to retrieve the corresponding value for said motor running speed S based on the frequency from the comparison list correlating the input signal with the motor running speed.

10. The method of claim 9, wherein said frequency signal is a sine wave or square wave.

11. A speed control selection apparatus for an electronically commutated motor comprising:
    a motor controller having an input terminal; and
    a speed control selection circuit having an output terminal; wherein
    said motor controller is electrically connected to the electronically commutated motor;
    said output terminal of said speed control selection circuit is (i) directly electrically connected to said input terminal of said motor controller, or (ii) connected to said input terminal of said motor controller via a photoelectric coupled circuit, said photoelectric coupled circuit isolating said motor controller from said speed control selection circuit;

said speed control selection circuit transmits an input signal T to said motor controller via one wire only;

said motor controller carries out the following steps: (i) retrieving a corresponding value for a motor running speed S from a comparison list correlating said input signal with the motor running speed, which list has been stored in the motor controller in advance, by searching said comparison list for said input signal T; and (ii) controlling a motor M to run at said motor running speed S.

12. The speed control selection apparatus of claim 11, wherein said speed control selection circuit is:

a voltage generating circuit having a variable voltage output;

a pulse generating circuit having a variable duty cycle output; or a sine wave or square wave generating circuit with a variable frequency output.

13. The speed control selection apparatus of claim 11, wherein said speed control selection circuit is a voltage generating circuit having a variable voltage output.

14. The speed control selection apparatus of claim 11, wherein said speed control selection circuit is a pulse generating circuit having a variable duty cycle output.

15. The speed control selection apparatus of claim 11, wherein said speed control selection circuit is a sine wave or square wave generating circuit with a variable frequency output.

16. The speed control selection apparatus of claim 11, wherein said output terminal of said speed control selection circuit is directly electrically connected to said input terminal of said motor controller.

17. The speed control selection apparatus of claim 11, wherein said output terminal of said speed control selection circuit is connected to said input terminal of said motor controller via a photoelectric coupled circuit, said photoelectric coupled circuit isolating said motor controller from said speed control selection circuit.

18. A method of speed control selection for an electronically commutated motor, comprising the steps of:

(a) a motor controller receiving an input signal T from a speed control selection circuit;

(b) said motor controller retrieving a corresponding value for a motor running speed S from a comparison list correlating said input signal with the motor running speed, which list has been stored in the motor controller in advance, by searching said comparison list for said input signal T; and (c) said motor controller is directly controlling said motor M via a single wire to run at said motor running speed S;

wherein said motor controller controls the motor M to run at said running speed S with a closed loop control mode, allowing the running speed to fluctuate within a small range, and keeping the motor at a stable speed;

said input signal T is a pulse signal, said pulse signal having a pulse width duty cycle, said duty cycle being variable over a certain duty cycle range whereby allowing the motor controller to retrieve the corresponding value for said motor running speed S based on the duty cycle from the comparison list correlating the input signal with the motor running speed; and said motor controller is connected to a motor M via a single wire.

* * * * *